United States Patent [19]

Okuda

[11] Patent Number: 5,740,445
[45] Date of Patent: Apr. 14, 1998

[54] INFORMATION PROCESSING APPARATUS FOR GENERATING DIRECTORY INFORMATION TO MANAGE A FILE USING DIRECTORIES

[75] Inventor: Osamu Okuda, Kawasaki, Japan

[73] Assignee: Canon Kabushiki Kaisha, Tokyo, Japan

[21] Appl. No.: 327,812

[22] Filed: Oct. 17, 1994

Related U.S. Application Data

[63] Continuation of Ser. No. 795,398, Nov. 21, 1991, abandoned.

[30] Foreign Application Priority Data

Nov. 21, 1990 [JP] Japan ............................ 2-316480

[51] Int. Cl.$^6$ ............................................ G06F 12/00
[52] U.S. Cl. ............................................ 395/707
[58] Field of Search ............................ 395/650, 700, 395/613

[56] References Cited

U.S. PATENT DOCUMENTS

| | | | |
|---|---|---|---|
| 4,682,318 | 7/1987 | Busby | 369/59 |
| 4,945,475 | 7/1990 | Bruffey et al. | 395/600 |
| 5,040,110 | 8/1991 | Miki et al. | 395/600 |
| 5,247,658 | 9/1993 | Barrett et al. | 395/600 |
| 5,276,874 | 1/1994 | Thomson | 395/600 |

FOREIGN PATENT DOCUMENTS

| | | |
|---|---|---|
| 0165382 | 12/1985 | European Pat. Off. . |
| 0260115 | 3/1988 | European Pat. Off. . |
| 8901663 | 2/1989 | WIPO . |

OTHER PUBLICATIONS

"Dynamic Data Structures on Optical Disks", P. Rathmann, Proceedings of the International Conference on Data Engineering 1984, Silver Springs, USA, pp. 175–180.

*Primary Examiner*—Kevin A. Kriess
*Assistant Examiner*—John Q. Chavis
*Attorney, Agent, or Firm*—Fitzpatrick, Cella, Harper & Scinto

[57] ABSTRACT

An information processing apparatus for generating directory information to manage a file using directories, includes a first generator for generating first directory information including first identification information to identify one of the directories and second identification information indicative of which directory the one of the directories belongs to. A recorder records the first directory information generated by the first generator on a recording medium and a reader reads the first directory information recorded on the recording medium. A second generator generates second directory information including the first and second identification information and third identification information indicative of which directory belongs to the one of the directories, on the basis of the first and second identification information of the first directory information read by the reader. The first identification information identifies one directory or one file, and the second generator generates the second directory information which includes the third directory information when the first identification information indicates the directory, while the second generator generates the second directory information which does not include the third identification information when the first identification information indicates the file.

8 Claims, 5 Drawing Sheets

FIG. 4

| SERIAL NO. ~101 | FILE NAME ~102 | ATTRIBUTES ~103 | POSITION INFORMATION ~104 | FILE SIZE ~105 | PARENT INFORMATION ~106 |
|---|---|---|---|---|---|
| 1 | F1 | f | F1-TOP | F1-SIZE | 0 |
| 2 | A | s | | | 0 |
| 3 | F2 | f | F2-TOP | F2-SIZE | 2 |
| 4 | B | s | | | 2 |
| 5 | F3 | f | F3-TOP | F3-SIZE | 4 |
| 6 | F4 | f | F4-TOP | | 4 |

FIG. 6

| SERIAL NO. | ADDRESS |
|---|---|
| 0 | Root |
| 2 | subA |
| 4 | subB |
| | null |

FIG. 9

| FILE NAME ~501 | ATTRIBUTES ~502 | POSITION INFORMATION ~503 | FILE SIZE ~504 |
|---|---|---|---|

INFORMATION PROCESSING APPARATUS FOR GENERATING DIRECTORY INFORMATION TO MANAGE A FILE USING DIRECTORIES

This application is a continuation of application Ser. No. 07/795,398 filed Nov. 21, 1991, which is now abandoned.

BACKGROUND OF THE INVENTION

1. Field of the Invention

The present invention relates to a directory management system for managing files recorded on an information recording medium, in which recorded data cannot be rewritten, using hierarchical directories.

2. Related Background Art

Conventionally, a directory management system is known as a technique for managing data recorded on an information recording medium.

In the directory management system, information called a directory entry for managing a file consisting of a data block is generated, information called a directory as a group of directory entries is recorded, and individual files are managed using the directory.

Conventional file management is performed by recording file information on an information recording medium such as a magnetic disk, in which recorded data can be rewritten, and is performed by a hierarchical directory management system for managing files in a hierarchical structure.

An example of the hierarchical directory management system will be explained below.

In the hierarchical directory management system, directories are dealt like normal files, and files are managed in units of directories.

The uppermost directory is called a root directory, and other lower directories are called sub-directories. Furthermore, an upper directory of a given sub-directory is called a parent directory.

FIG. 3 shows a model of a hierarchical directory structure.

FIG. 3 illustrates a root directory Root, normal files F1 to F4, and sub directories A and B.

In the root directory, directory entries of the file F1 and the sub-directory A are recorded.

In the sub directory A, directory entries of the file F2 and the sub-directory B, and directory entries of the root directory as a parent directory of the sub-directory A, and the sub-directory A itself are recorded.

In the sub-directory B, directory entries of the files F3 and F4, and directory entries of the sub-directory A as a parent directory of the sub-directory B, and the sub-directory B itself are recorded.

When an access target is changed from the root directory to the sub-directory A, the sub directory A is read out from a recording medium using the directory entry of the sub-directory A in the root directory, and a file managed by the directory A is accessed using a directory entry included in the sub-directory A.

When an access target is changed from the sub-directory A to the root directory, the root directory is read out from the recording medium using the directory entry of the root directory in the sub directory A, and a file managed by the root directory is accessed using a directory entry included in the root directory.

FIG. 9 exemplifies a directory entry format on a magnetic disk.

As shown in FIG. 9, the directory entry format includes, as file information, a file name 501, an attribute 502, position information 503, and a file size 504.

Of these pieces of information, the file name 501 is named by a user to identify a file.

The attribute 502 is information for identifying whether information indicated by a directory entry is a normal file or a sub-directory. When the attribute indicates a sub-directory, the corresponding directory entry indicates a group of directory entries, i.e., a directory.

The position information 503 is information indicating a position on a magnetic disk where a file begins to be recorded, and the file size 504 indicates an effective byte count of a file.

In the sub-directory, the directory entries of a parent directory and the sub-directory itself are recorded. Thus, access from a given directory to another directory is enabled, thus realizing a hierarchical directory structure.

In this management system, files are managed in units of directories. When an access target is changed from a given directory to another, the destination directory is read out from an information recording medium using a directory entry of the destination directory.

In this structure, when a directory is edited by, e.g., adding or updating a file, for example, when a new file F5 is added to the sub-directory A, a directory entry for managing the file F5 is added to the sub-directory A, thus re-recording the entire sub-directory A.

When the content of the file F5 is edited, the directory entry for managing the file F5 in the sub-directory A is edited, thus re-recording the entire sub-directory A.

In this manner, every time a directory entry is edited, all the pieces of information in a sub-directory or a root directory including the edited directory entry are re-recorded.

However, when the above-mentioned hierarchical directory management system is executed in an information recording medium, in which recorded data cannot be erased, every time a file is added or edited, a new sub-directory or root directory must be added, and directory entries which need not be edited, must be re-recorded. As a result, many non-edited directory entries are repetitively recorded, and are undesirably left unerased. Thus, the effective recording capacity is decreased, and directory search time is prolonged.

SUMMARY OF THE INVENTION

It is an object of the present invention to provide an improved directory management system.

It is another object of the present invention to provide a directory management system which can effectively utilize a recording area of a recording medium.

It is still another object of the present invention to provide a directory management system which can shorten directory search time.

It is still another object of the present invention to provide a directory management system which is suitable for a recording medium, in which recorded data cannot be erased.

Other objects and features of the present invention will become apparent from the following detailed description of the preferred embodiments and the accompanying drawings.

BRIEF DESCRIPTION OF THE DRAWINGS

FIG. 4 shows a table directory entry data recorded on an information recording medium in the embodiment shown in FIG. 1;

FIG. 6 shows a directory table used when the directory entries are developed in the hierarchical structure in the embodiment shown in FIG. 1;

FIG. 9 exemplifies a conventional directory entry format used in a magnetic disk.

DETAILED DESCRIPTION OF THE PREFERRED EMBODIMENTS

Figure 1:
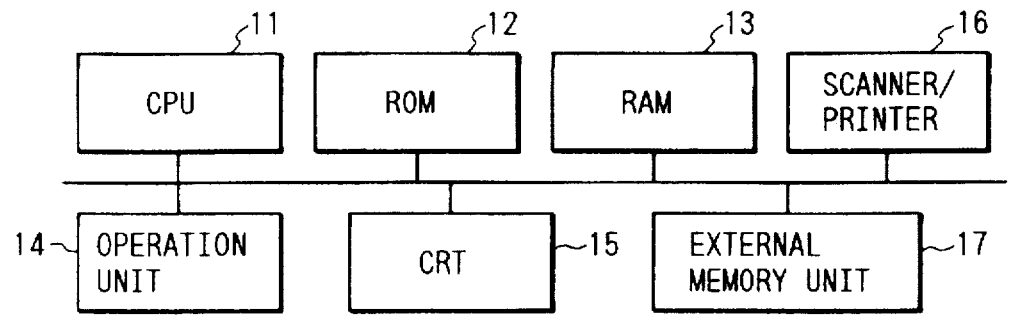
FIG. 1 is a block diagram showing an arrangement of an information processing apparatus using a directory management system according to an embodiment of the present invention.

FIG. 1 is a block diagram showing an arrangement of an information processing apparatus using a directory management system according to an embodiment of the present invention.

The information processing apparatus comprises a CPU 11 for executing various processing operations in this embodiment, a ROM 12 for storing a control program for the CPU 11, and the like, a RAM 13 used as a work area where the CPU 11 executes a control operation, an operation unit 14 used by an operator to input various data, a CRT 15 for making various displays for the operator, a scanner/printer 16 for reading/outputting image information, and an external memory unit 17 for filing various data on an information recording medium such as an optical disk, a hard disk, or the like.

In the information processing apparatus, directory entries for managing corresponding files are independently recorded on the information recording medium. These directory entries are read out to a predetermined area in the RAM 13, and are converted into a hierarchical structure. Thus, an imaginary directory is formed on the predetermined area in the RAM 13, and files can be managed in a hierarchical structure.

Figure 2:
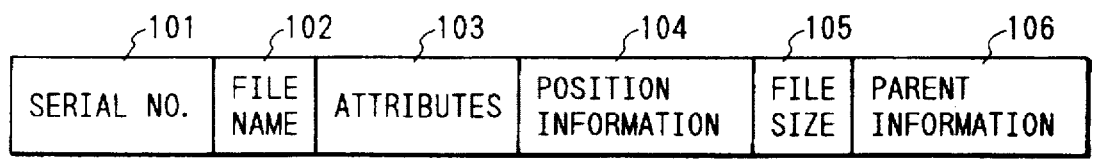
FIG. 2 shows a directory entry format in the embodiment shown in FIG. 1.

FIG. 2 shows an example of the format of a directory entry.

A serial number 101 is information for identifying a given directory entry.

A file name 102 is a name of a file indicated by the directory entry.

An attribute 103 is used for discriminating a type of the directory entry.

Position information 104 indicates a position (e.g., a sector address) on the recording medium where a file managed by the directory entry is recorded.

A file size 105 indicates a size (a used sector count, a byte count, and the like) of a file managed by the directory entry.

Parent information 106 is information for identifying a parent directory of the directory entry.

Figure 8:
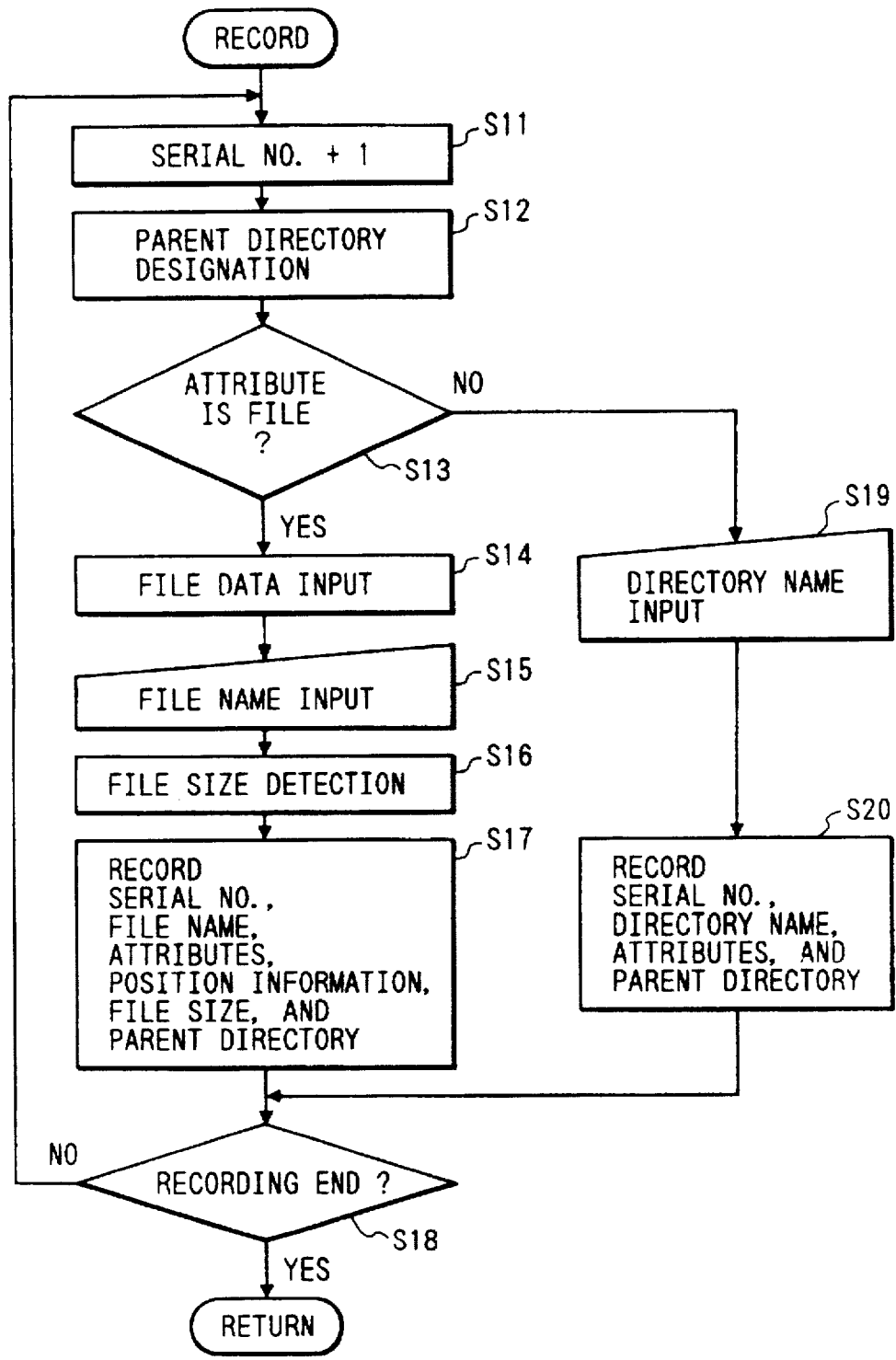
FIG. 8 schematic flow chart showing recording processing in the embodiment shown in FIG. 1.

FIG. 8 is a flow chart for recording data from the external memory unit 17 on a recording medium.

The CPU 11 increments the current serial number by one (step S11), and requests an operator to input a parent directory of a file or directory to be recorded from the operation unit 14 (step S12). If no directory is recorded, a directory called a root directory is defined as the parent directory. The CPU 11 requests the operator to input, from the operation unit 14, an attribute indicating whether data to be recorded is a file or directory. If the input attribute is a file (step S13), file data is read from the scanner/printer 16 or is input from the operation unit 14 (step S14). The CPU 11 requests the operator to input a file name from the operation unit 14 (step S15). The CPU 11 then detects a file size of the input file data (step S16). Furthermore, the serial number, the file name, the attribute, the position information indicating position of the file in the recording medium, the file size, and the parent directory are recorded from the external memory unit 17 onto the recording medium (step S17). If there is more data to be recorded, the flow advances to step S11; otherwise, the flow returns to a main program (step S18). If it is determined in step S13 that the attribute is a directory, the CPU 11 requests the operator to input a directory name (step S19), and the serial number, the directory name, the attribute, and the parent directory are recorded from the external memory unit 17 (step S20). The flow then advances to step S18. In this manner, a file or a directory is recorded.

These pieces of information can be recorded in any order.

Figure 3:
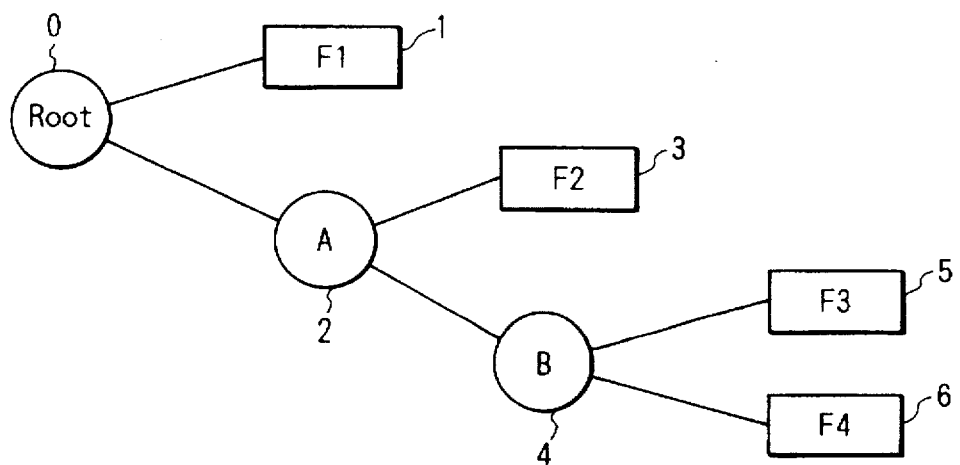
FIG. 3 exemplifies a model of a hierarchical directory structure in the embodiment shown in FIG. 1.

FIG. 3 shows a model of a hierarchical directory structure.

FIG. 3 illustrates a root directory Root, normal files F1 to F4, and sub-directories A and B.

In this embodiment, pieces of information of the respective directory entries are properly set, so that directories in a hierarchical structure as shown in FIG. 3 can be developed on an imaginary directory development region allocated in a memory (RAM 13).

FIG. 4 shows the directory entries recorded on the information recording medium in the format shown in FIG. 2.

As shown in FIG. 4, the directory entries of the sub directories A and B, the directory entries of the files F1 to F4, and the files F1 to F4 are recorded on the recording medium.

The serial numbers are added to the recorded directory entries in the order of their recording operations, and are used as pieces of parent information indicating parent directories of other directory entries. The serial number of the root directory is defined as 0 although the root directory is not recorded on the information recording medium. Therefore, the serial number "0" of the root directory is recorded in parent information of each of the directory entries of the file F1 and the sub directory A.

An attribute indicates a normal file or a sub directory. When "f" is set in the attribute, it indicates a normal file; when "s" is set, it indicates a sub directory. A directory entry, in which the attribute indicates a sub directory, represents a sub directory name (in this embodiment, A or B) and parent information when data is read out and converted into a hierarchical structure. The directory entries of the sub-directories A and B recorded on the recording medium do not include information of lower sub-directories or files. For this reason, imaginary directories in a hierarchical structure must be generated on the basis of the directory entries read out from the recording medium.

Furthermore, pieces of position information F1-TOP, F2-TOP, F3-TOP, and F4-TOP respectively indicate the positions of the files F1, F2, F3, and F4 on the recording medium. File sizes F1-SIZE, F2-SIZE, F3-SIZE, and F4-SIZE respectively indicate byte counts of the files F1, F2, F3, and F4.

The position information and the file size are significant only when the attribute indicates a normal file. When the attribute indicates a sub directory, these pieces of information are insignificant.

The directory entries can be written on and read out from the information recording medium one by one. The directory entries are read out in turn beginning from the serial number "1".

In the following description, the directory entries of the sub-directories A and B will be referred to as directories A and B, and the directory entries of the files F1 to F4 will be referred to as directories F1 to F4.

Figure 5:
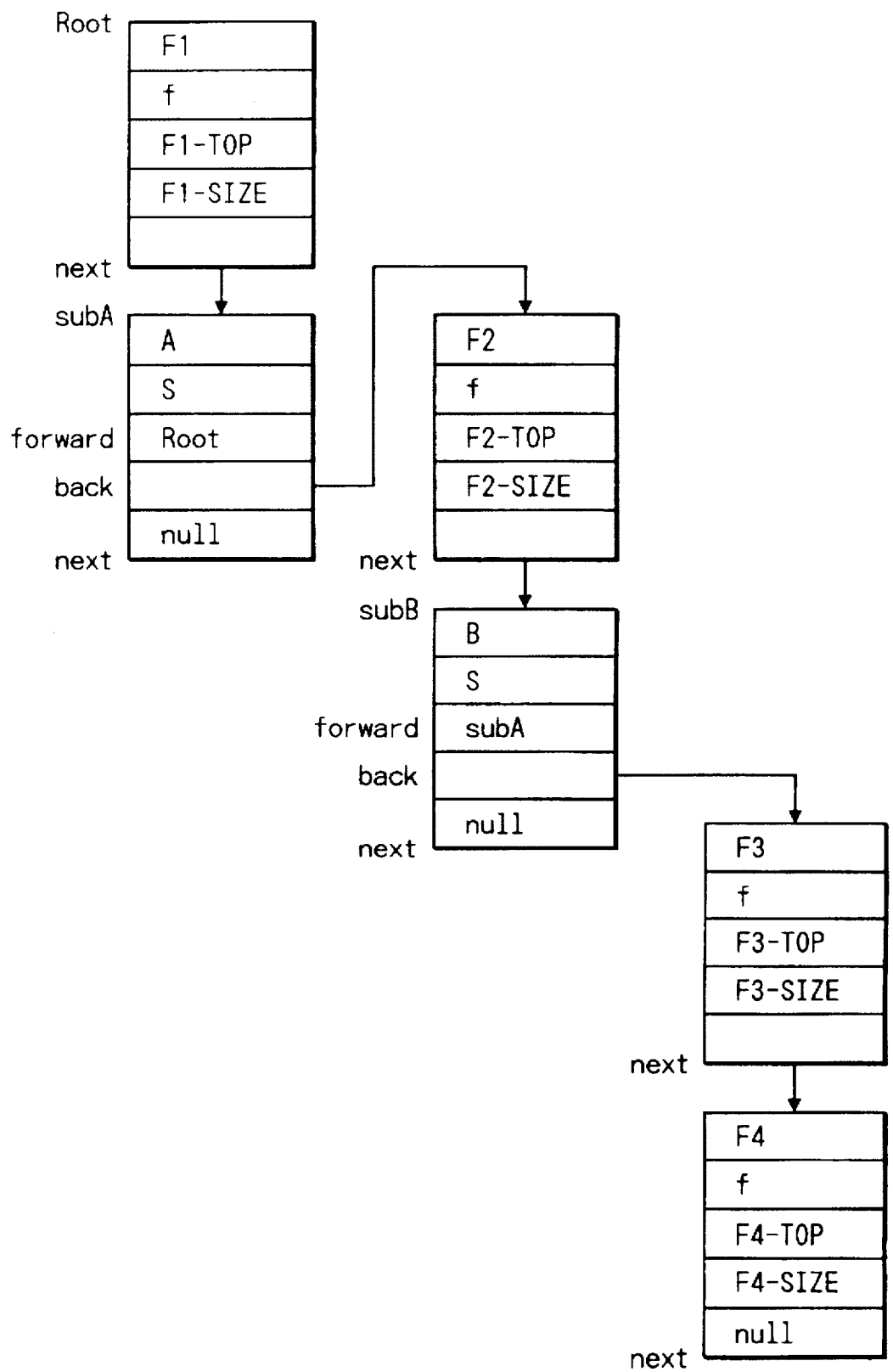
FIG. 5 is a view showing a state wherein directory entries are developed in a hierarchical structure on a memory in the embodiment shown in FIG. 1.

FIG. 5 shows imaginary directories obtained by reading out directory entry data (FIG. 4) recorded on the information recording medium, and developing them into a hierarchical structure on the imaginary directory development area in the memory (RAM 13).

In FIG. 5, information "Root" indicates the beginning of directory entry data of the root directory, and information "subA" and information "subB" respectively indicate the beginnings of directory entry data of the sub-directories A and B.

"next" is information used for linking directory entries belonging to the root directory or a sub-directory, and indicates an address of the linked next directory entry.

Furthermore, "null" indicates that the linked directory entry is the last one.

"forward" and "back" are pieces of information, which are set only when the attribute indicates a sub directory. Information "forward" indicates the start address of a parent directory, and information "back" indicates the start address of a first directory entry belonging to the sub-directory.

FIG. 6 shows a directory table used when the directory entry data shown in FIG. 4 are developed onto the memory, as shown in FIG. 5. This directory table is allocated on an area separate from the imaginary directory development area shown in FIG. 5 on the RAM 13.

The directory table stores the serial numbers and start addresses of the root directory and sub-directories. The directory table has a function of indicating the start address of a directory corresponding to parent information of directory entry data when the directory entry data is developed, and performing a search operation on the imaginary directory development area.

In an initial state wherein none of directory entries are read out, information "null" indicating that no data is registered in the directory table shown in FIG. 6, is set.

Note that the address of the root directory "Root" on the imaginary directory development area shown in FIG. 5, and the start address of the directory table shown in FIG. 6, are determined in advance.

Figure 7:
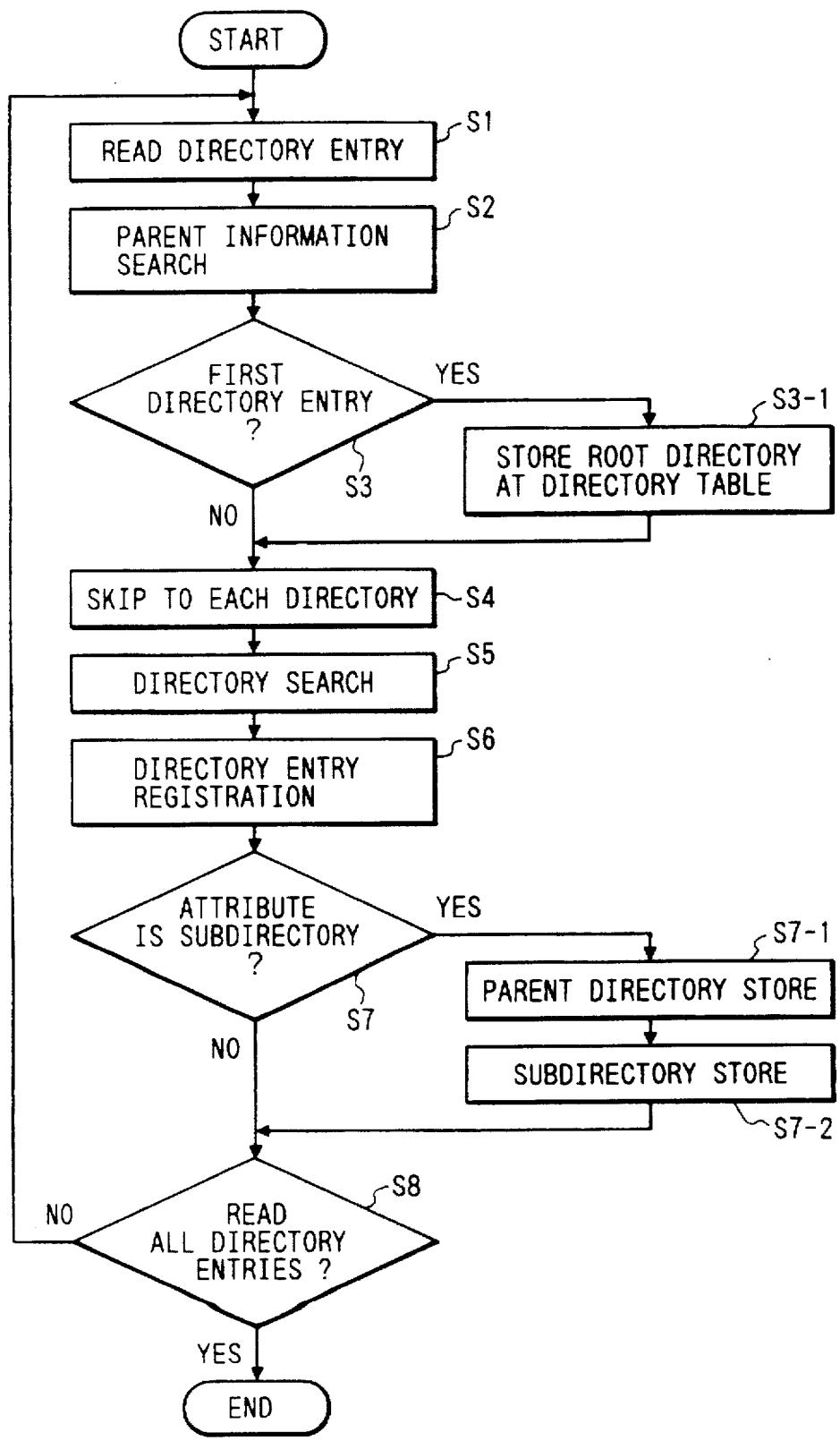
FIG. 7 is a schematic flow chart showing processing for converting the directory entries into the hierarchical structure in the embodiment shown in FIG. 1.

FIG. 7 is a schematic flow chart showing processing in which the CPU 11 converts directory entries recorded on the information recording medium into a hierarchical structure on the imaginary directory development area.

The directory entries shown in FIG. 4 are read out from the information recording medium in the order of serial number, and parent information of each directory entry is read (S1).

The directory table shown in FIG. 6 is looked up on the basis of the predetermined address to search for parent information, i.e., to check whether or not the directory table includes a serial number corresponding to the parent information read in step S1 (S2). If the directory table does not include the corresponding serial number, it is determined that the read-out entry data is the first directory entry (S3). The predetermined skip destination address and the serial number "0" of the root directory are stored in the directory table (S3-1).

If it is determined in step S3 that the directory table includes at least one serial number, processing in step S3-1 is omitted.

The serial number on the directory table is searched based on the parent information read out in step S1, and the control skips to the start address of each directory on the imaginary directory development area shown in FIG. 5 on the basis of an address corresponding to the searched serial number (S41). The search operation is continued in the directory already registered on the imaginary directory development area to obtain information indicating a skip destination of the next directory entry (S5). When information "null" indicating the last directory entry is detected, the directory entry is registered on the imaginary direction development area (S6).

Thereafter, the attribute of the directory entry is discriminated. If the attribute indicates a sub-directory, the skip destination address of the parent directory of the sub directory is stored in the directory table (S7-1), and the serial number and the skip destination address of the directory entry of the sub directory are stored in the directory table (S7-2).

If it is determined in step S7 that the attribute does not indicate a sub directory, steps S7-1 and S7-2 are omitted.

It is determined whether all the directory entries in the recording medium have been read out (S8). The above-mentioned processing is repeated from step S1 until all the directory entries are read out.

As described above, the directory entries in the recording medium are sequentially registered on the imaginary directory development area in the RAM 13, thereby generating directories in a hierarchical structure.

The conversion processing will be described in detail below according to the contents of the directory entry data shown in FIG. 4.

The directory F1 corresponding to the serial number "1" is read out (S1). In the directory F1, the attribute indicates a normal file, and parent information is "0". Thus, the serial number "0" is searched from the directory table shown in FIG. 6 (S2).

However, since the directory table stores only information "null", it is determined that the directory F1 is the first directory (S3), and the serial number "0" and information "Root" indicating the beginning of the root directory are stored in the directory table (S3-1).

The directory F1 is registered in the information "Root" on the imaginary directory development area (S4, S5, S6). At this time, information "null" is set in information "next" indicating the skip destination address to the next directory entry.

Since all the directory entries have not yet been read out (S7, S8), the directory A corresponding to the serial number "2" is read out (S1). In the directory A, the attribute indicates a sub-directory, and the parent information is "0".

The serial number "0" is searched from the directory table (S2), and the control skips to the root directory "Root" on the imaginary directory development area as the skip destination of the serial number "0" (S3, S4). In this case, a search operation is repeated until the information "next" of the directory entry in the root directory "Root" becomes "null" (S5). When the information "next" becomes "null", an address of the next directory entry to be registered on the imaginary directory development area is set in this information "next", and the directory A is registered using this address (S6).

In this case, since the attribute of the directory A indicates a sub-directory, information "Root" indicating the beginning of the root directory as a parent directory is set in information "forward" (S7, S7-1). Information "null" indicating that no data is registered is set in information "next" for accessing a directory entry belonging to the sub directory A. The address SubA at which the directory A is registered, and the serial number "2", are stored in the directory table (S7-2).

The directory F2 corresponding to the serial number "3" is read out (S1). In the directory F2, the attribute indicates a normal file, and parent information is "2".

The serial number "2" is searched from the directory table (S2). The control skips from the directory table to the address subA as a skip destination of the serial number "2" (S3, S4). Since information "null" is set in information "next" indicating a skip destination to a directory entry belonging to the directory A, it is determined that there is no directory entry belonging to the sub-directory A (S5). An address on the imaginary directory development area, where the directory F2 is registered, is set in information "back" of the directory A, and the directory F2 is registered at this address (S6).

When recording operations are performed as described above to register all the directory entries, the hierarchical structure shown in FIG. 5 can be obtained.

In this embodiment, the directory entries are read out from the recording medium one by one. Alternatively, after all the directory entries are read out, they may be converted into a hierarchical structure.

Files can be managed in the hierarchical structure shown in FIG. 3 using the directories developed on the imaginary directory development area in the RAM 13, as shown in FIG. 5.

More specifically, when an access target is changed from the root directory to the sub-directory A, a directory entry is searched from the root directory Root so as to access a file managed by the directory A of the sub-directory A.

When an access target is changed from the sub-directory A to the root directory, the control can skip to "Root" as the beginning of the root directory on the basis of the information "forward" in the directory entry of the sub-directory A, thus realizing access to files managed by the root directory.

In this manner, the directory entries shown in FIG. 4 need only be recorded on the recording medium.

A case will be explained below wherein a file is added or edited. For example, when a file F5 is added below the sub-directory A, a directory entry of the file F5, which entry includes an attribute=normal file and parent information= serial number "2" of the sub-directory A, is additionally recorded from the external memory unit onto the recording medium. The list of the directory A on the RAM 13 is searched to be linked with the directory B.

When the file F5 is edited, a new directory entry of the file F5 is additionally recorded from the external memory unit onto the recording medium, and the content of a directory F5 on the RAM 13 is edited.

When identical file names are detected upon conversion of directories into a hierarchical structure, a directory having a larger serial number, i.e., a directory recorded later, can be used as a significant directory.

As described above, in this embodiment, since all the directory entries are read and are held on the memory, when an access target directory is changed, the target directory need not be read out from the recording medium again. When a directory is edited, only a directory entry to be edited is recorded, thus shortening a recording time.

In the above embodiment, as information for identifying directory entries, serial numbers added to the directories are used. Information for identifying only a file name or each sub-directory may be added, and may be used in identification. Means for converting directories into a hierarchical structure on the basis of attributes and parent information included in the directories is not limited to that of the above embodiment.

According to the present invention, hierarchical directory management can be applied not only to a recording medium, in which recorded cannot be rewritten, but also to a recording medium, in which data can be rewritten.

As described above, when a directory entry is edited by adding or editing a file, the directory entry to be edited need only be re-recorded. In particular, in hierarchical directory management for an information recording medium, in which recorded data cannot be rewritten, a recording capacity can be saved, and a search time can be shortened.

What is claimed is:

1. An information processing apparatus comprising:

first generation means for generating first directory information including first information to identify a directory and second information indicating a parent directory of the directory;

recording means for recording the first directory information generated by said first generation means on a non-rewritable recording medium;

reading means for reading the first directory information recorded on the non-rewritable recording medium;

second generation means for generating second directory information including the first and second information and third information indicating a child directory of the directory, on the basis of the first and second information of the first directory information read by said reading means;

storage means for storing in memory other than the non-rewritable recording medium the second directory information generated by said second generation means; and managing means for managing the directory in accordance with the second directory information stored in said storage means.

2. An information processing apparatus according to claim 1, wherein the first directory information includes a name of the directory.

3. An information processing apparatus according to claim 1, wherein the recording medium comprises an optical recording medium.

4. An information processing apparatus according to claim 1, wherein the recording medium is detachable.

5. A method for managing a directory in an information processing apparatus, comprising the steps of:

generating first directory information including first information to identify one of the directories and second information indicating a parent directory of the directory;

recording the generated first directory information on a non-rewritable recording medium;

reading the first directory information recorded on the non-rewritable recording medium; and generating second directory information including the first and second information and third information indicating a child directory of the directory, on the basis of the first and second information of the read first directory information, wherein the second directory information is stored in memory other than the non-rewritable recording medium, and the directory is managed in accordance with the second directory information stored in the memory.

6. A method according to claim 5, wherein the first directory information includes a name of the directory.

7. A method according to claim 5, wherein the recording medium comprises an optical recording medium.

8. A method according to claim 5, wherein the recording medium is detachable.

* * * * *